(12) United States Patent
Tichý et al.

(10) Patent No.: US 7,228,187 B2
(45) Date of Patent: Jun. 5, 2007

(54) SYSTEM AND METHOD FOR INTERFACING MULTI-AGENT SYSTEM

(75) Inventors: Pavel Tichý, Nymburk (CZ); Francisco P. Maturana, Mayfield Heights, OH (US); Kenwood H. Hall, Hudson, OH (US); Raymond J. Staron, Richmond Heights, OH (US); Petr Šlechta, Ceska Lipa (CZ); Vladimír Mařík, Prague (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 254 days.

(21) Appl. No.: 10/814,549

(22) Filed: Mar. 31, 2004

(65) Prior Publication Data
US 2004/0250168 A1    Dec. 9, 2004

Related U.S. Application Data

(63) Continuation-in-part of application No. 10/737,384, filed on Dec. 16, 2003.

(60) Provisional application No. 60/433,892, filed on Dec. 16, 2002, provisional application No. 60/553,360, filed on Mar. 15, 2004.

(51) Int. Cl.
| | |
|---|---|
| *G05B 15/00* | (2006.01) |
| *G05B 9/02* | (2006.01) |
| *G05B 19/18* | (2006.01) |
| *G06F 19/00* | (2006.01) |
| *G06E 1/00* | (2006.01) |
| *G06F 17/00* | (2006.01) |

(52) U.S. Cl. .............................. 700/83; 700/79; 700/2; 700/181; 706/10; 706/46

(58) Field of Classification Search .................. 700/83, 700/79, 51, 112, 286, 34, 2, 181, 49; 706/10, 706/46, 29, 61
See application file for complete search history.

(56) References Cited

U.S. PATENT DOCUMENTS

| | | | |
|---|---|---|---|
| 5,963,447 A * | 10/1999 | Kohn et al. | 700/49 |
| 6,027,112 A * | 2/2000 | Guenther et al. | 271/194 |
| 6,067,477 A | 5/2000 | Wewalaarachchi et al. | |
| 6,088,689 A * | 7/2000 | Kohn et al. | 706/10 |
| 6,108,616 A * | 8/2000 | Borchers et al. | 702/183 |
| 6,119,052 A * | 9/2000 | Guenther et al. | 700/228 |
| 6,266,805 B1 | 7/2001 | Nwana et al. | |
| 6,285,977 B1 * | 9/2001 | Miyazaki | 703/26 |
| 6,400,999 B1 | 6/2002 | Kashiyama et al. | |
| 6,459,944 B1 | 10/2002 | Maturana et al. | |
| 6,647,300 B1 | 11/2003 | Balasubramanian et al. | |
| 2004/0250168 A1 | 12/2004 | Tichy et al. | |

FOREIGN PATENT DOCUMENTS

JP    2000 322171 A    11/2000

OTHER PUBLICATIONS

Bergenti, Federico, et al., "Exploiting UML in the Design of Multi-Agent Systems," Engineering Societies in the Agent's World (ESAW), First International Workshop, Lecture notes in Artificial Intelligence, v. 1972 (revised papers), Aug. 21, 2000, pp. 106-113, Springer-Verlag, Berlin, Germany.

Ndumu, Divine, et al., "Visualizing and Debugging Distributed Multi-agent Systems," proceedings from the 3rd Annual Conference on Autonomous Agents, Seattle, Washington, May 1-5, 1999, pp. 326-333, ACM Sigart, New York, New York.

Zhan, Cui, et al., "An In-Service Agent Monitoring and Analysis System," proceedings from the 11th International Conference on Tools With Artificial Intelligence IEEE Computers, Nov. 9-11, 1999, pp. 234-244, Los Alamitos, California.

Poslad, Stefan, et al., "The FIPA-OS agent platform: Open Source for Open Standards," proceedings of the Fifth International Conference on the Practical Application of Intelligent Agent and Multi Agent Technology Practical Application Company, 2000, pp. 355-368, Blackpool, United Kingdom.

Nwana, Hyacinth, et al., "Zeus: A Toolkit for Building Distributed Multiagent Systems," Applied Artificial Intelligence, v. 13, 1999, pp. 129-185, Washington, DC.

* cited by examiner

*Primary Examiner*—Thomas K. Pham
(74) *Attorney, Agent, or Firm*—Keith M. Baxter; R. Scott Speroff

(57) ABSTRACT

A system and method of interacting with a multi-agent distributed control system employing a plurality of controllers on which are programmed a plurality of agents in which the controllers are coupled by a network are disclosed. The method includes providing a computer program capable of operating a user interface, where the computer program is in communication with the agents via the network. The method further includes displaying agent-related information on the user interface by way of a plurality of windows, where within a first of the windows is further displayed a workflow among at least some of the agents, and within a second of the windows is further displayed at least one of a plurality of messages communicated among at least some of the agents, a work unit requested by at least one of the agents, and message content associated with at least one of the messages.

19 Claims, 6 Drawing Sheets

SYSTEM AND METHOD FOR INTERFACING MULTI-AGENT SYSTEM

CROSS-REFERENCE TO RELATED APPLICATIONS

This application is based on U.S. provisional patent application no. 60/553,360 filed Mar. 15, 2004 and entitled "Agent Program Environment", and also is a continuation-in-part of U.S. patent application Ser. No. 10/737,384 filed on Dec. 16, 2003 and entitled "Decentralized Autonomous Control for Complex Fluid Distribution Systems", which is based on provisional application No. 60/433,892 filed Dec. 16, 2002 and entitled "Agent-Based Active Diagnostics System for Complex Distribution Networks", each of which is hereby incorporated by reference herein, and claims the benefit thereof.

BACKGROUND OF THE INVENTION

The present invention relates to computerized control systems and, more particularly, distributed control systems that employ multiple, distinct control devices that are connected to one another by way of a network and that interact with one another in a manner allowing for overall control of a process.

A variety of commercial and industrial processes can be automated using one or more industrial controllers (or industrial computers). Generally, an industrial controller is a specialized computer providing input/output (I/O) circuitry attached to sensors and actuators on the machines of the industrial process. The industrial controller executes a control program to read inputs from sensors on the machines implementing the process, and based on the values of those inputs and control logic of the control program, produces outputs to actuators to control the process. Industrial controllers are frequently modular in construction, so that the number of input and output circuits and the processor power can be tailored to the demands of the particular process.

Although complicated processes can be controlled using a single controller, distributed control by way of multiple controllers is advantageous over central control for a variety of reasons. In particular, distributed control systems can be more robust than central control systems in terms of being able to sustain the failure of a particular controller. Additionally, distributed control systems can be less costly to program and less demanding in terms of communication bandwidth since not all messages need be provided to a single central controller.

Recently, distributed control systems employing multiple intelligent agents, which also can be termed agents or autonomous cooperative units (ACUs), at multiple distributed controllers have generated interest. In such multi-agent systems (which also can be termed autonomous cooperative systems), a job description is presented to a large number of agents. The agents, based on knowledge of their own capabilities and limitations, bid on portions of the job in response to requests for bids from other agents. Effectively, the agents execute their own program, such that control programs are simply developed and the potential exists for control programs to be quickly changed as new circumstances develop, such as changes in the control problem or the loss of particular agents and/or equipment. Such multi-agent systems are applicable to a wide variety of situations, and a description of one exemplary multi-agent system is described, for example, in certain of the aforementioned patent applications.

Although multi-agent distributed control systems offer many advantages, multi-agent distributed control systems are difficult to monitor while in operation. This is due at least in part to the variation in agents and their responsibilities within such control systems, the large numbers of messages that are typically sent among the agents of such systems, and the complexity of both the messages and the agents' functions. Further, in part because of the difficulty in monitoring multi-agent systems, it also is difficult to determine how system operation can be improved or adjusted to meet new or changed goals, and consequently difficult to control/modify the operation of such systems to achieve such new or changed goals (e.g., to "deploy" or "redeploy" the agents), either in real-time or off-line. Additionally, it can be difficult to debug multi-agent systems, either while those systems are operating or when the systems have stopped operating.

BRIEF SUMMARY OF THE INVENTION

The present inventors have recognized that an apparatus and method are necessary for effectively interfacing a multi-agent system that allows users to monitor and evaluate characteristics of the multi-agent system, and to control, modify, deploy/redeploy, and, where necessary, debug the multi-agent system. The present inventors further have recognized that particular operational features of a multi-agent system are of particular interest. Among these are characteristics of the agents themselves, the messages that are communicated among the agents, and the work units that are requested by, and responded to and met by, the agents.

Additionally, the present inventors have recognized that one advantageous manner of representing the behavior of agents in a multi-agent system would involve the display of a tree-type diagram showing workflow among agents performing a work unit. Further, the present inventors have recognized that, in at least some embodiments, it would be desirable to display multiple windows showing different types of agent-related information simultaneously. In some cases, such information displayed in the different windows could be interlinked such that, upon receiving a request from a user that precipitated a change in the information displayed in one of the windows, the information displayed in others of the windows would change in a manner corresponding to the change in the information displayed in the one window.

In particular, the present invention relates to a system for allowing a user to interact with a multi-agent distributed control system. The system includes a computerized terminal on which is displayed a user interface, where the user interface includes a first window displaying a workflow among a first plurality of agents of the multi-agent system.

The present invention also relates to a distributed control system that includes a network, a plurality of controllers programmed with a plurality of agents, wherein the controllers are in communication with one another by way of the network, and a terminal coupled to the network and capable of providing a human machine interface (HMI). The HMI displays a plurality of windows on which are displayed information regarding at least some of the agents, a plurality of messages communicated among at least some of the agents, and a workflow occurring among at least some of the agents.

The present invention further relates to a method of interacting with a multi-agent distributed control system employing a plurality of controllers on which are programmed a plurality of agents, the controllers being coupled by a network. The method includes providing a computer program capable of operating a user interface, where the computer program is in communication with the agents via the network. The method additionally includes displaying agent-related information on the user interface by way of a plurality of windows, where within a first of the windows is further displayed a workflow among at least some of the agents, and within a second of the windows is further displayed at least one of a plurality of messages communicated among at least some of the agents, a work unit requested by at least one of the agents, and message content associated with at least one of the messages.

DETAILED DESCRIPTION OF THE PREFERRED EMBODIMENT

Figure 1:
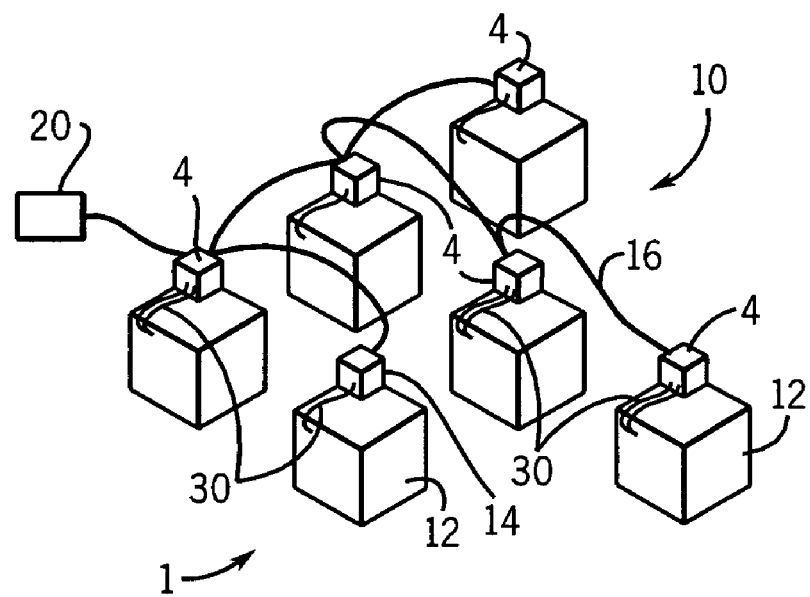
FIG. 1 is a simplified perspective view of a process including a number of separate machines intercommunicating via distributed controllers connected over a network forming a distributed control system such as may be used with the present invention.

Referring to FIG. 1, a distributed control system 10 controls and/or monitors the operation of a process performed by a plurality of machines 12, each of which is associated with a respective electronic computer or controller 4,14 of the control system. Each controller 4,14 is configured for electrical communication through a respective I/O line 30 with its respective machine or machines. The process can be any of a variety of different processes in a variety of environments such as, for example, an industrial process performed by a plurality of manufacturing machines such as drills, lathes, ovens, mills and the like. Also, for example, the process could relate to the distribution of a resource or multiple resources, such as water within a naval vessel, energy from energy producers to energy consumers by way of a power distribution grid, or heated or cooled air within a building employing a heating, ventilation and air-conditioning (HVAC) system. In such embodiments, the controllers 4,14 can be ControlLogix or FlexLogix programmable control modules commercially available from Rockwell Automation, Inc. of Milwaukee, Wis., the beneficial assignee of the present invention. Further, the machines 12 are representative of any devices that can be controlled or monitored by a distributed control system, and are intended to encompass, for example, actuatable machines, sensors, communication devices, and input/output devices.

The electronic controllers 4,14 are linked to each other via a network 16 of a type well known in the art allowing for connected messaging or other communication protocol between the various controllers 4,14, such that each of the controllers 4,14 can produce messages for or consume messages from others of the controllers 4,14. The network 16 can be, for example, an Ethernet, ControlNet or DeviceNet-type network (or even the internet) and, in certain embodiments, is representative of multiple redundant networks (which can be implemented using redundant network media) to resist failure. A human machine interface HMI 20, being a conventional computer terminal or other similar device, can be attached to the network 16 or to one or more of the controllers 4,14 (as shown) to allow for programming of the various controllers or for other data entry, system monitoring, system controlling or system debugging purposes as will be described below. In alternate embodiments, the HMI 20 is coupled to the network 16 or one or more of the controllers 4,14 by way of the world wide web or internet (not shown). In such embodiments, the HMI 20 can employ a browser program while the distributed control system 10 (or portion thereof, e.g., one of the controllers 4,14) employs a server program, or vice-versa. In some alternate embodiments, the HMI 20 or human-machine interfaces like it could be considered some of the machines 12.

Figure 2:
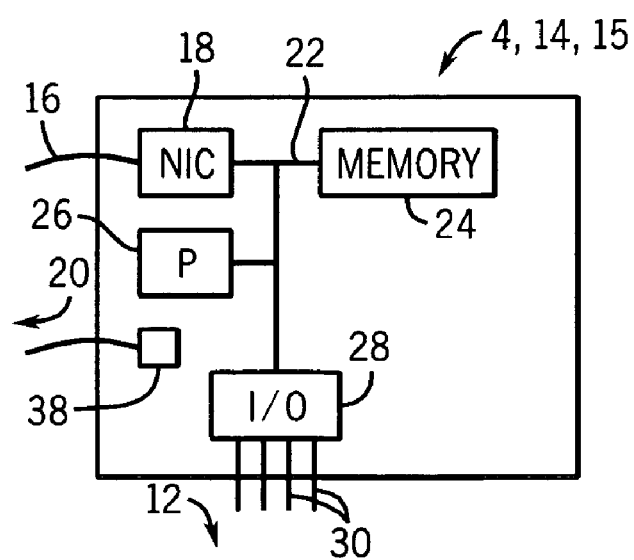
FIG. 2 is a block diagram of exemplary hardware components of one of the controllers of FIG. 1, which include a processor, a memory holding data and programs executed by the processor, a network card providing an interface to the network of FIG. 1 and I/O circuits for communicating with the machines of FIG. 1.

Referring now to FIG. 2, exemplary hardware components 15 within each of the controllers 4,14 are shown. In particular, the hardware components 15 at each of the controllers 4,14 include a network interface 18 of conventional design for transmitting and receiving messages on the network 16 and communicating them to an internal bus 22 (which typically is a high-speed bus). The internal bus 22 links the network interface 18 with memory 24, a processor 26 and I/O circuits 28, the latter of which provide the I/O lines 30 leading to sensors or actuators on the machines 12.

Depending upon the embodiment, the hardware components of the controllers 4,14 can vary from those shown. In certain embodiments, for example, a secondary communication port is available for connection of the HMI 20. Also, for example, the memory 24 can take a variety of forms and need not include only a single memory device. Further, in certain embodiments, one or more of the controllers 4,14 can employ more than one memory device, including one or more memory devices that are not physically located at the respective controller, such as memory devices that are located at others of the controllers 4,14 or at other locations with which the respective controller can be in communication by way of the network 16 or other communication media.

Figure 3:
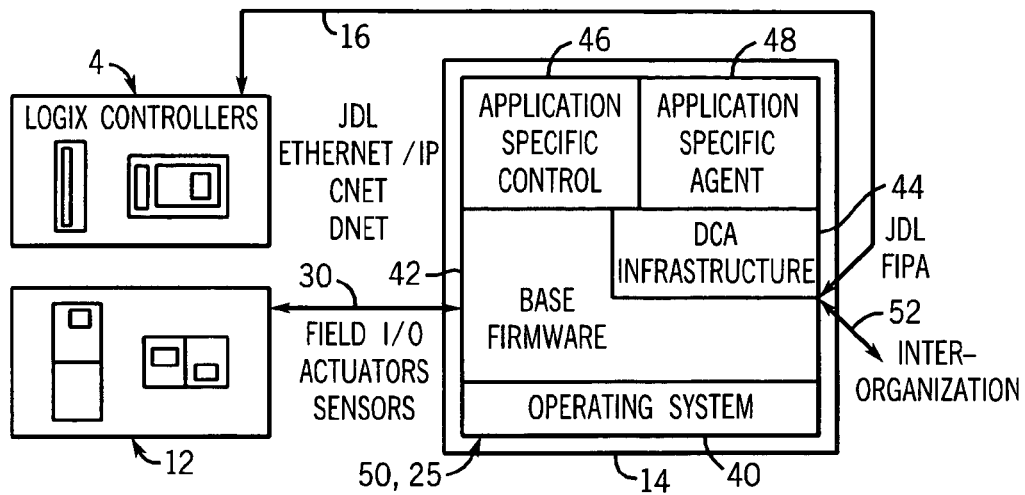
FIG. 3 is a block diagram showing exemplary software components that are included within at least one of the controllers of FIG. 1 and operate together as at least one agent.

Turning to FIG. 3, the hardware components 15 within each of the controllers 4,14 operate in conjunction with various software components 25 so as to operate as one or more intelligent agents (or simply agents) 50, such that the distributed control system 10 as a whole operates as a multi-agent system (or "MAS"). The software components 25 of each of the controllers 4,14 can be stored within the memory 24 of the respective controller (or elsewhere) and executed by the processor 26 of that controller. Each agent 50 is an autonomous cooperative unit that encapsulates application knowledge, and is capable of autonomous, proactive, reactive, and social behaviors in relation to the other agents in order to adapt the distributed control system 10 to different tasks and to adjust in response to the occurrence of unforeseen conditions.

More particularly, each agent 50 is autonomous such that it makes its own decisions, is responsible for carrying out its decisions toward successful completion, and controls and/or monitors the respective machine(s) 12 assigned to it. Also, each agent 50 is capable of cooperating with other agents, to adapt and respond to diverse events and mission goals by adjusting its behavior and that of the machine(s) 12 it controls. To enable this cooperation, all of the agents 50 typically share a common language, as discussed further below. Depending upon the embodiment, either one or more than one agent 50 can be employed on each of the controllers 4,14. Often, although not necessarily, the number of agents 50 implemented on a given one of the controllers 4,14 will correspond to the number of machines 12 that are being controlled by way of that controller.

FIG. 3 shows in detail one exemplary embodiment of the software components 25 that can be included within the controllers 4,14 so that the controllers are capable of operating as agents. In particular, FIG. 3 shows the software components 25 within a representative one of the controllers, namely, the controller 14. As shown, the software components 25 within the controller 14 forming the agent 50 include an operating system 40, base firmware 42, distributed control agent (DCA) infrastructure firmware 44, application-specific control program software 46, and application-specific agent software 48. Although all of these various components are necessary to form the agent 50 in this embodiment, in alternate embodiments, other software components could be employed instead of these software components. For example, the DCA infrastructure firmware 44 could be combined with the application-specific control program software 46 to form a single software component.

The exact manner in which the distributed controllers 4,14 are programmed (or otherwise configured) to operate as agents can vary depending upon the embodiment of the invention, so long as such distributed controllers are in fact programmed (or otherwise configured) to operate as agents. Nevertheless, in the present embodiment employing the aforementioned software components 25, the operating system 40 can be any of a variety of operating systems or similar programs that are capable of governing low-level operations of the controller 14 and supporting the operation of each of the other software components 25, for example, a conventional multitasking operating system such as the Windows NT operating system.

The base firmware 42 is representative of conventional software programming (typically stored in a read-only memory) that is capable of governing interactions between the controller 14 and devices external to the controller. For example, the base firmware 42 formats signals produced by the agent 50 for communication onto the network 16 so that those signals are in accordance with the protocol of the network (e.g., in accordance with the requirements of an Ethernet, ControlNet or DeviceNet-type network and/or, in some embodiments, the TCP/IP or UDP/IP protocol, or the IEEE802.11b (wireless) protocol), and also is able to receive and process signals received off the network 16, so that the signals can be understood by the agent 50. The base firmware 42 also governs communications between the controller 14 and the machine(s) 12 coupled to the controller by way of the I/O line(s) 30, as well as between the controller 14 and other devices at external organizations (as indicated by arrow 52).

The base firmware 42 also enables the creation and use of (and otherwise supports the operation of) the application-specific control program software 46, which governs the manner in which the agent 50 controls and/or monitors the machine(s) 12 assigned to the agent. The application-specific control program software 46 typically is customized for operation with the particular machine(s) 12 being controlled/monitored by the particular controller 14. Often the application-specific control program software 46 is written in ladder logic code, although depending upon the embodiment this need not be the case.

In addition to the operating system 40, the base firmware 42 and the application-specific control program software 46, the software components 25 further include the DCA infrastructure firmware 44 and the application-specific agent software 48. Each of these latter two software components includes programming that governs certain high-level or "agent-type" behaviors of the agent. The application-specific agent software 48 is application-specific in that it typically reflects the specific machine(s) 12 that have been assigned to the particular agent 50 to be controlled and/or monitored, and/or the particular distributed application or process with which the agent 50 is affiliated. To properly interact with the specific machine(s) 12 assigned to the agent 50, the application-specific agent software 48 of the agent is capable of interacting with the application-specific control program software 46. In at least some embodiments, such communication between these two software components occurs by way of a data table (not shown).

The DCA infrastructure firmware 44 operates as an extension of the base firmware 42, particularly in order to govern, support and facilitate agent-type functionality of the agent 50 in accordance with both the DCA infrastructure firmware itself and the application-specific agent software 48. The DCA infrastructure firmware 44, in contrast to the application-specific agent software 48, governs high-level agent behavior of the agent 50 that is not agent-specific, and is common among multiple agents of the distributed control system 10. The DCA infrastructure 44 is in direct communication with the base firmware 42 (and/or, in certain alternate embodiments, with the operating system 40) and the application-specific agent software 48. Among its many functions, the DCA infrastructure 44 supports multi-threaded communications among the different agents 50 existing at the different controllers 4,14, between the agents of the distributed control system 10 and those of external organizations by way of alternate communication linkages 52, as well as between multiple agents of a single controller when multiple agents are associated with a single controller. To support and conduct these communications, it is the DCA infrastructure firmware 44 that constructs messages for transmission to other agents, and likewise the DCA infrastructure firmware that disassembles received messages for interpretation. Additionally, in the present embodiment, the DCA infrastructure firmware 44 also wraps and unwraps these messages in additional protocol information as discussed further below.

Further, it is the DCA infrastructure firmware that conducts the planning of the agent 50 in terms of determining how it will interact with other agents and how it will control or otherwise interact with the machine(s) 12 under its control. Thus, it is the DCA infrastructure that determines how to negotiate with, and generates bid request and bid messages for, other agents. In certain embodiments, the DCA infrastructure firmware 44 is priority-based and, particularly where the distributed control system 10 is employed in an industrial environment, the application-layer protocol employed by the DCA infrastructure firmware is a protocol commonly utilized by industrial control systems such as the Common Industrial Protocol (CIP). The DCA infrastructure firmware 44 is typically written in a high-level programming language such as C++ or JAVA, although the language can vary from embodiment to embodiment.

As shown in FIG. 3, in the present embodiment, messages between different agents 50 are scripts communicated in the job description language (JDL), and wrapped in additional formatting information in accordance with a specialized, universally-accepted communication language, which in the present embodiment is the Foundation for Intelligent Physical Agents (FIPA) Agent Communication Language (ACL). Although the base firmware 42 initially receives incoming messages and processes those messages to remove protocol information specific to communication over the network 16 (e.g., Ethernet protocol information), it is the DCA infrastructure firmware 44 that further processes the received messages to unwrap the JDL information of the messages from the FIPA ACL wrapper and then extract the content of the JDL messages having to do with communication between agents. Likewise, it is the DCA infrastructure firmware 44 that creates agent messages in the JDL language, and wraps those messages in the FIPA ACL wrapper prior to the messages being further configured by the base firmware 42 for transmission over the network 16.

In alternate embodiments, the messages between agents 50 could be in any of a number of other formats or languages other than JDL, such as XML, KQML or HTML. Also, in alternate embodiments, languages other than FIPA ACL could be employed as a wrapper about the messages. Further information regarding the manner of communication among agents is provided in U.S. Pat. No. 6,647,300 entitled: Bidding Partner Cache For Autonomous Cooperative Control System; U.S. Pat. No. 6,459,944 entitled: Self-Organizing Industrial Control System Using A Specific Process To Evaluate Bids; U.S. Pat. No. 6,430,454 entitled: Self-Organizing Industrial Control System Using Iterative Reverse Modeling To Evaluate Bids; U.S. Pat. No. 6,272,391 entitled: Self Organizing Industrial Control System Importing Neighbor Constraint Ranges, and U.S. Patent Application Publication No. 2003/0078678A1 entitled: Language Structure For Autonomous Cooperative Control System, each beneficially assigned to the present assignee and hereby incorporated by reference.

Although not shown, the DCA infrastructure 44 in at least some embodiments includes various software subcomponents that include, in particular, one or more directory facilitators by which the agent 50 is provided with information about other agents of the distributed control system 10 and about their capabilities. Such directory facilitators can include multiple layers of directory facilitators including, for example, global directory facilitators (GDFs) and local directory facilitators (LDFs), where the LDFs generally store information that is of interest to the particular controller(s) or agent(s) with which the LDFs are respectively associated, and the GDF(s) generally store information that is of interest to the entire distributed control system 10 or of interest at least to sections of the distributed control system that encompass multiple LDFs. In some embodiments, each directory facilitator of the DCA infrastructure firmware 44 includes a first, "white pages" portion that includes information correlating names and addresses of agents, and a second, "yellow pages" portion correlating names and capabilities of agents.

Further description of LDFs and GDFs is provided in U.S. patent application Ser. No. 09/621,718 entitled Global Resource Locator for Autonomous Cooperative Control Systems, which is beneficially assigned to the present assignee and hereby incorporated by reference. Additionally, further description of the software components 25 shown in FIG. 3, as well as description of software subcomponents within the DCA infrastructure firmware 44, which can include the LDFs and GDFs, is provided in U.S. provisional patent application No. 60/553,360 entitled Agent Program Environment and filed on Mar. 15, 2004, which also is beneficially assigned to the present assignee and hereby incorporated by reference. In alternate embodiments, LDFs and GDFs can also be implemented as separate agents rather than as merely software subcomponents within agents that serve other purposes within the multi-agent system.

Once the controllers 4,14 of the distributed control system 10 are programmed with the software components 25 (and any necessary related data), the distributed control system 10 is capable of operating as a MAS. Thus, the agents 50 are capable of intercommunicating to organize themselves to control a distributed process, such as the operation of a factory or the distribution of chilled-water within a complex system such as a naval vessel. Such organization of the agents 50 typically occurs in accordance with a process shown in FIGS. 4–5.

Figure 4:
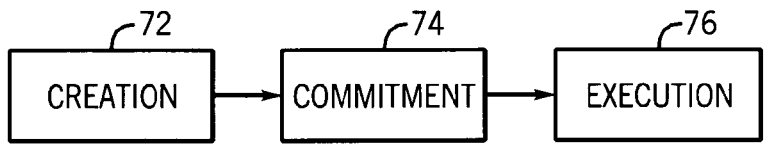
FIG. 4 is a block diagram showing exemplary steps of operation of the controllers of FIG. 1 by way of the agent-forming software components shown in FIG. 3.

Turning to FIG. 4, the operation of agents 50 of the controllers 4,14 of the multi-agent system (including, possibly, multiple agents at any given controller and/or agents at external organizations) can be understood generally to include three phases in which the agents communicate with one another to collaboratively address system needs. These phases are a creation (or planning) phase 72, a commitment phase 74, and an execution phase 76. During the creation (or planning) phase 72, one or more of the agents of the various controllers 4,14 initiate a collaborative decision-making process. Typically, this occurs when one or more of the agents determine that a system need has arisen. Upon determining that a need has arisen, the one or more agents issue one or more work bid requests to other agents. In response, others of the agents supply bids back to the requesting agent(s). In the present embodiment, these work bid request and bid messages among the agents are in the JDL language, although in alternate embodiments other languages can be used. Also, in certain embodiments, the ContractNet protocol is used to perform these dynamic negotiations. Further, the bids supplied back to the requesting agent(s) in some cases are formed by way of further subcontracting that occurs between certain of the agents, typically by way of additional work bid requests/bids. This subcontracting occurs through the use of the subcontracting management algorithms implemented by the agents.

The agents 50 typically determine whether they can bid, and how much they can bid, in response to work bid requests based upon their respective application-specific agent software 48, which can employ a variety of decision-making algorithms such as, for example, algorithms that employ money-type rules or pricing-type rules. The determinations by the agents also are based upon various information that is accessible to the agents including, for example, information regarding the capabilities of the machine(s) controlled by the agents, information regarding their respective capabilities as agents, and information regarding the capabilities of other agents, the last of which can be made available by way of the directory facilitators as discussed above.

When one of the agents 50 accepts a work bid request, an instance of a plan template is created at that agent to record values emerging during the planning process. Information is encoded as a sequence of hierarchical actions with possible precedence constraints. Once a satisfactory solution has been identified (or, in the case of multiple possible solutions, once a preferred solution has been identified), the requesting agent and the agent(s) that have submitted preferred bid(s)

commit their resources to complete the work in the future, in the commitment phase 74. Further, once the commitment phase 74 is completed, the agents carry out the execution of the plans during the execution phase 76.

Although in some embodiments the commitment phase 74 begins and is completed immediately or nearly immediately upon completion of the creation phase 72, in other embodiments, the agents remain in the commitment phase for a significant amount of time. This can be the case, in particular, where scheduling of agent operations is important. In these circumstances, it sometimes is desirable for agents to delay the commitment of their resources for periods of time before finally committing those resources, in order to retain the options of utilizing those resources for various different operations. Thus, in these embodiments, agents are provided with an additional degree of freedom of operation insofar as the agents need not instantaneously decide how they wish to commit their resources during the commitment phase 74.

Figure 5:
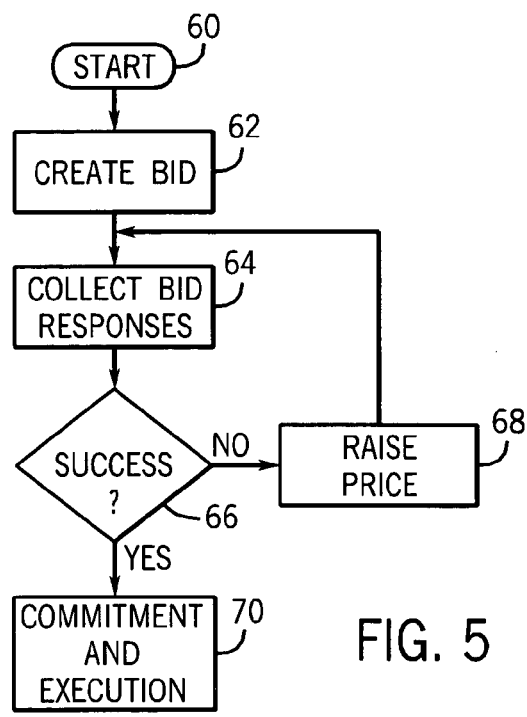
FIG. 5 is a flowchart depicting in more detail the steps of FIG. 4 performed by an exemplary agent, particularly in order to create a plan.

Referring specifically to FIG. 5, exemplary operations of one of the agents 50 of the distributed control system 10 that is a requesting agent (e.g., an agent determines that a work need exists and interacts with other agents to find a way of meeting that work need) is shown in more detail. As indicated by a start block 60, the existence of a work need can be determined by an agent initially upon start-up of the system, such as when one or more of the machines 12 start operation, or upon a system occurrence, such as when one or more of the machines 12 experience failures. At this time, that agent will create one or more work bid requests as indicated by process block 62, which are then forwarded to other agents that control resources that might satisfy the work bid request (e.g., as determined by way of information contained in the directory facilitators as discussed above).

A work bid request is a message that describes a work unit that the agent (or the resources controlled by that agent) cannot perform or meet, such that the assistance of other agents (or resources controlled by those agents) is required to meet the work need. Work bid requests can specify various types of requirements depending upon the circumstance. In at least some embodiments, the work bid requests can provide constraints that must be met in order for the other agents to bid in response to the work bid requests such as, for example, money/pricing or timing limits.

At process block 64, the requesting agent collects any and all bid response messages containing bids from other agents that have evaluated the work bid request and concluded that they can perform the work unit, or at least collaborate with other agents to perform the work unit, in a manner meeting the constraints set forth in the work bid request. Then, at process block 66, a determination is made by the requesting agent as to which of the bid responses is best in terms of being able to satisfactorily perform the work unit and also satisfy other requirements of the work bid request. The best bid response is selected and, upon its selection, the agents then commit to the agreed-upon plan and then execute the work unit in accordance with the agreed-upon plan as shown in step 70 (which corresponds to both of the commitment and execution phases 74, 76 discussed above).

If no bid responses have been provided in response to a work bid request, then one or more of the characteristics of the work bid request and the constraints set forth in the work bid request can be modified or eased, for example, the maximum allowable price can be raised as shown in step 68. Upon such modification of the work bid request, the modified work bid request can then be sent out to other agents, as indicated in FIG. 5 by the arrow returning from step 68 to the arrow linking steps 62 and 64 (in alternate embodiments, the arrow returning from step 68 could also be shown as returning to step 62, or returning to the arrow connecting steps 60 and 62, thus indicating that an entirely new bid is created and sent out based upon the modification performed at step 68). Also, to the extent that a bid response provided by a responding agent back to the requesting agent involves a collaboration of that responding agent with other agents, the bid response only can be obtained after a process similar to that shown in FIG. 5 has been performed among that responding agent and the other agents.

That is, in the event that an agent receives a work bid request and determines that it cannot entirely perform the work unit set forth in that request, the agent attempts to determine (e.g., by way of directory facilitators) whether other agents could potentially satisfy the portions of the work unit that it cannot satisfy. In the event that such other agents are identified, the agent that received the initial work bid request then sends out its own work bid requests to the other agents it has identified, awaits bid responses from the identified agents, and upon receiving such responses determines a best response (or, to the extent no responses are received, can resend out additional requests). Typically, it is only upon determining such a best response that the agent that received the original work bid request sends its own bid response to the original requesting agent. Thus, the bidding process set forth in FIG. 5 by a requesting agent often, if not typically, involves multiple layers of bids, sub-bids, work bid requests and sub-work bid requests among different layers of agents.

Turning to FIGS. 6–9, in accordance with an embodiment of the present invention, the HMI 20 is capable of displaying first, second, third and fourth screens 80, 120, 160, and 200, respectively, which are capable of providing information regarding the operation of the distributed control system 10 with its multiple agents 50 during operation and/or after a period of operation has been completed. Through the use of a user input device that is part of the HMI 20, a user can also interact with various portions of the screens 80, 120, 160 and 200, such that the user is able to vary the information that is shown, and able to control, modify, influence, or otherwise deploy or debug the agents of the multi-agent system. The user input device can take any one of a variety of forms including, for example, a mouse, touch screen, touch pad, keyboard, track ball, other types of buttons, and variety of other devices known to those of ordinary skill in the art. In alternate embodiments, any computerized terminal that is in communication (at least temporarily) with the distributed control system 10 can be employed instead of (or in addition to) the HMI 20 including, for example, a terminal at one of the controllers 4,14 that is equipped with a video screen or similar user interface.

Figure 6:
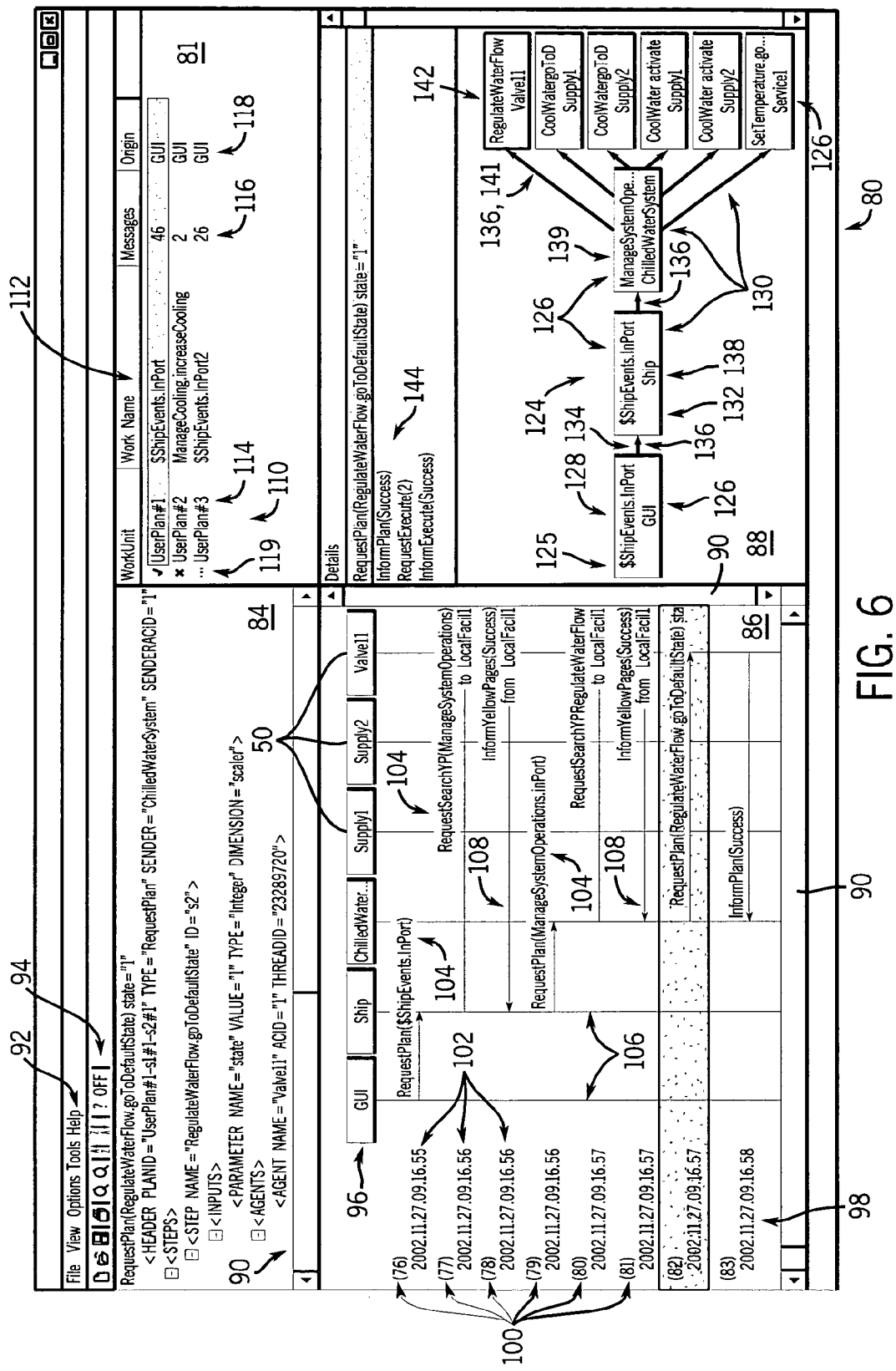
FIGS. 6–9 are exemplary screens of a human machine interface of (or coupled to) the distributed control system of FIG. 1 that allows a user to interact with the agents of the distributed control system.

Referring specifically to FIG. 6, the first screen 80 allows for monitoring of interactions among the agents 50 of the distributed control system 10, particularly messages among the agents relating to the accomplishment of various work units. In a preferred embodiment, the first screen 80 as shown includes first, second, third, and fourth windows 81, 84, 86, and 88, respectively, which can be arranged as shown as four quadrants of the screen. Each of the windows 81, 84, 86, and 88 can take on a conventional window format, for example, such that each of the windows includes one or more scrolling bars/buttons 90 along its perimeter. Additionally, the overall screen 80 can have conventional features along its top such as a list of drop down menu items 92 and a number of user-selectable icons 94 that allow for a user to save, print and otherwise manipulate information shown on the screen 80.

With respect to the content of the windows 81, 84, 86, and 88 themselves, each of those windows displays a particular respective subset of information concerning the operation of the multi-agent system. To begin, the third window 86 (e.g., the window corresponding to the third quadrant of the screen 80) displays along its top edge a list 96 of the agents 50 of the multi-agent system (or at least a subset of those agents) and thus, in the example shown, a series of agents termed GUI, Ship, ChilledWater, Supply1, Supply2, and Valve11 are shown. Additionally, the third window 86 provides a list 98 of each of the messages that have been communicated among the different agents in the list 96. Each of the messages in the list 98 is given a message number 100 and also is given a date and time stamp 102 corresponding to the date/time at which the respective message was sent (or alternately received by the HMI 20), along with a name or description of the message 104. For example, as shown in FIG. 6, an exemplary message having number 82 was sent at 09.16:57 on Nov. 27, 2002 from the ChilledWater agent to the Valve11 agent, and had a name of "RequestPlan (RegulateWaterFlow.goToDefaultState) state".

Further, extending downward from each of the agents 50 in the horizontally-extending list of agents 96 along the top of the screen 86 are a plurality of vertical lines 106. A respective one of the vertical lines 106 extends downward from each of the respective agents 50. Additionally, for each of the messages in the list 98, a respective arrow 108 is displayed that extends between the vertical bars 106 corresponding to the agents between which the respective message was sent, with the arrowhead of the arrow pointing to the vertical bar corresponding to the agent that received the message.

The number 100, date/time stamp information 102, name/description 104, and arrow 108 corresponding to each respective message is all aligned within the same row and, consequently, the window 86 serves to provide a graphical illustration both of the sequential occurrences of messages and the manner in which messages are being sent among different agents. In the embodiment shown, the information is generally displayed in a sequential UML (unified modeling language) format, although in alternate embodiments the information could also be displayed in other formats.

Because the number of agents 50 displayed in the list 96 can be large, such that not all of the agents can be displayed at one time within the window 86, one of the scroll bars 90 allows for shifting of the screen to allow different agents and the messages communicated between those agents to be visible. Also, if an arrowhead cannot be displayed (when the appropriate receiving agent is not visible), then "to" and the name of the receiving agent are displayed over the corresponding horizontal message line (e.g., within a row corresponding to the message), along the border of the screen 86. Similarly, if the tail of an arrow cannot be displayed (when the sending agent is not visible), then "from" and name of the sending agent are displayed over the horizontal message line (e.g., within a row corresponding to the message) at the border of the screen 86. In certain embodiments, a user can rearrange the ordering of agents in the list 96, so that certain groups of agents and message information relating to those agents can be viewed all at once. Likewise, in certain embodiments, a user can rearrange the ordering of messages along the list 98.

Still referring to FIG. 6, the first window 81 of the screen 80 shows a list 110 of the work units that have been requested by a particular one of the agents 50 (or, in alternate embodiments, several of the agents). With respect to each work unit displayed in the list 110, the list includes a name of the work unit 112, a work unit identifier 114, a number of messages that have been sent among the agents 50 in connection with that work unit 116, an identification of the agent that has originally requested the particular work unit 118 (e.g., by way of a work bid request message), and an indication of a status of the work unit 119, for example, whether the work unit is "in progress" or has been "successfully" or "unsuccessfully" completed. In the example shown, three work units are included within the list 110 that respectively have the names $ShipEvents.InPort, ManageCooling.increaseCooling, and $ShipEvents.InPort2. Each of these displayed work units is indicated to have been originally requested by the GUI agent. Further as shown, the first of these work units (e.g., $ShipEvents.InPort) is shown by way of a pictographic indication/icon 119 to have been successfully completed, while the second of these work units is shown to have been unsuccessfully completed and the third of these work units is shown to be in progress.

With respect to the fourth window 88, this window provides a workflow view in which the interrelationship of agents that are collaborating to perform a work unit are shown in a graphical manner. In the embodiment shown, the relationships among different agents to perform a work unit are shown in a tree-type diagram 124. The tree-type diagram 124 includes a plurality of boxes 126 representing different agents that are involved with performing the particular work unit (and subportions of that work unit). In particular as shown, at a left end 125 of the tree-type diagram 124 is a first of the boxes 126 that represents the agent 50 that has originally requested a work unit and also identifies the requested work unit itself. In the example shown, the GUI agent has requested a work unit entitled $ShipEvents.InPort. Further, to the right of this first box, the tree-type diagram 124 shows additional boxes 130 corresponding to the agents that have become involved in performing the work unit in response to the GUI agent's work bid request.

As discussed above, although in some circumstances a work unit can be handled entirely by a single agent, in many circumstances a work unit can only be handled by numerous agents that are working in concert with one another. Thus, when a requesting agent such as the GUI agent requests bids from other agents to handle the work unit, the responding agents may submit bids that have been formulated based upon further sub-bid requesting and sub-bid responses provided to and by tertiary agents. In this manner, the original work unit is subdivided into one or more sub-work units. The tree-type diagram 124 allows a user to visualize such interrelationships among agents that allow for the handling of a work unit by creating a division of labor among multiple agents that respectively handle different sub-work units.

In particular, the tree-type diagram 124 provides, in each of the boxes 130 of the tree-type diagram 124, both an agent identifier 132 and a work unit/sub-work unit identifier 134. Thus, each of the boxes 130 identifies a respective agent that is contributing to the handling of the work unit requested by the requesting agent identified in the first box at the left end 125, along with the respective work unit or sub-work unit that is being handled by the respective agent. When a particular agent has subcontracted out to other agents, that particular agent is shown to be responsible for a work unit or sub-work unit that encompasses the sub-work units of the subcontracting agents. Further as shown, the tree-type diagram 124 includes arrows 136 that connect the various boxes 126 to show more clearly the relational hierarchy among the agents as they take on larger or smaller portions of the requested work unit or portions of that work unit.

Thus, in the example shown, the tree-type diagram 124 not only shows that a GUI agent has requested a work unit entitled $ShipEvents.InPort, but also shows that a Ship agent has taken on the responsibility for handling the work unit $ShipEvents.InPort. Further, the tree type diagram 124 shows that the Ship agent has subcontracted with a ChilledWaterSystem agent (shown in a box 139) in order that the ChilledWaterSystem agent take on a portion of the $ShipEvents.InPort work unit, namely, a ManageSystemsOperation.InPort sub-work unit. In turn, further agents Valve11, Supply1, Supply2 and Service1 (shown in additional boxes 142) have agreed to handle sub-work units of the ManageSystemsOperation.InPort sub-work unit. To the extent that the tree-type diagram 124 is sufficiently large that it cannot entirely be viewed at one time within the window 88 or on the screen 80, a relevant portion corresponding to a particular work unit or work sub unit can be scrolled to and displayed by way of one of the bars 90.

In the present embodiment, the arrows 136 take on an additional function beyond simply showing the hierarchical relationships among agents. That is, the arrows 136 represent the one or more messages that are communicated among the different agents in planning, committing to, and/or executing the work units and sub-work units. A user can display a listing 144 of the message(s) that have been communicated between a pair of agents by selecting the arrow connecting those agents. When multiple messages have been communicated between a pair of agents represented by a pair of the boxes 126, the listing 144 shows all of those messages (or, in alternate embodiments, a subset of those messages). Thus, in the example shown, an arrow 141 has been selected by the user and consequently the listing 144 shows four messages that have been communicated between the agents corresponding to that arrow 141.

In alternate embodiments, the fourth window 88 can be further configured to display communications of agents with directory facilitators (e.g., LDFs and/or GDFs) that are agents, when such directory facilitator agents are part of the workflow. In such embodiments, the tree-type diagram 124 displays a selected workflow that includes boxes (or tree leaves) corresponding to the directory facilitators.

As for the second window 84, this window displays message content of one (or more) messages, particularly message(s) that have been selected by a user via a user command. The displayed message information can include, for example, capabilities information or programming code such as, as shown, extensible mark up language (XML) format code.

In a preferred embodiment, the four windows 81, 84, 86 and 88 are interlinked with one another in terms of the information that is displayed in the windows. For example, when one of the messages shown in the third window 86 is highlighted by way of a user input command (in this example, the message 82), then the second window 84 displays the content associated with that message and the first window 81 displays the work unit with which that message is associated. Additionally, when the message in the third window 86 is highlighted, the fourth window 88 shows a tree-type diagram corresponding to the work unit with which the highlighted message is associated (in this example, the $ShipEvents.InPort work unit). Within that tree-type diagram, an arrow that corresponds to the highlighted message (in this example, the arrow 136) is selected or highlighted, and the list of messages 144 displayed in the fourth window 88 is updated to include and highlight the message that was highlighted in the third window.

Also for example, in certain embodiments, when one of the work units in the list 110 of the first window 81 is selected in a particular manner (e.g., by way of "right clicking" on that work unit), a menu appears that includes a "Set Filter to . . . " option. When this option is selected, then a message filter and/or agent filter is applied so that the third window 86 then displays all of the agents of the tree-type diagram and the messages communicated among those agents that correspond to the selected work unit (such filters are further discussed below with reference to FIGS. 7 and 8). Also, if one of the messages displayed in the listing 144 along the top of the fourth window 88 is selected, then the third window 86 automatically highlights that message within the list of messages 98, the second window 84 provides a list of that message's content, and the first window 81 displays the work unit with which that message is associated.

These manners of displaying agent interrelationships and messages among agents shown and discussed with reference to FIG. 6 are intended to allow a user to rapidly obtain information regarding the behavior of the agents of the distributed control system 10. Not only does this facilitate monitoring of agents and debugging of improper agent behavior, but also this facilitates controlling and modifying agent behavior so that new or modified goals for the distributed control system and/or portions of the system can be achieved. That is, the displayed information is intended to allow for changes in the deployment of agents within the multi-agent system. The manner of display shown and discussed with reference to FIG. 6 is intended to be exemplary, and the present invention is intended to encompass other manners of display that would be evident to those of ordinary skill in the art. For example, although the screen 80 is shown to display all four of the windows 81, 84, 86 and 88 simultaneously, in alternate embodiments, the windows need not all be displayed together on a single screen (e.g., one or more of the windows could be associated with other screens).

Figure 7:
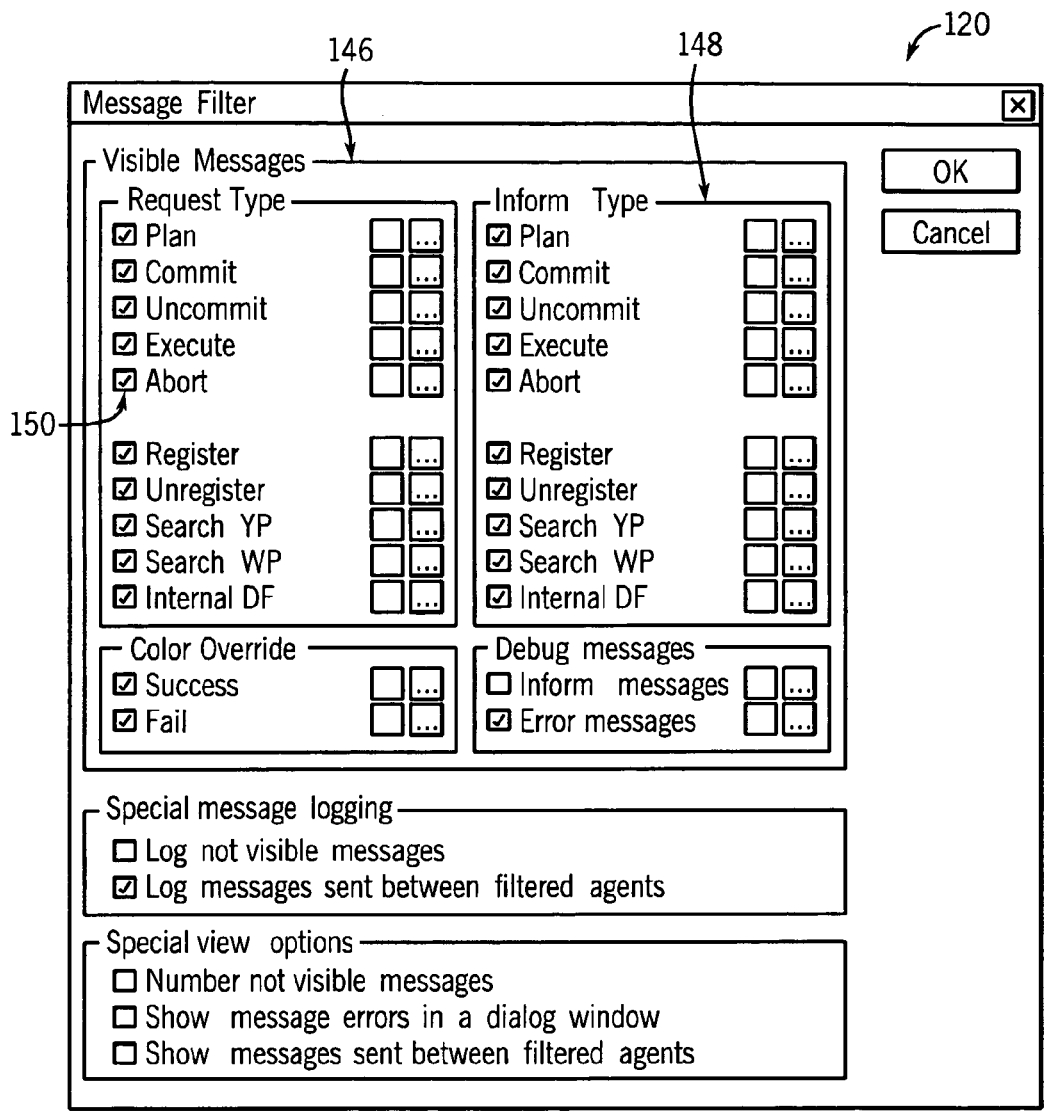
Figure 8:
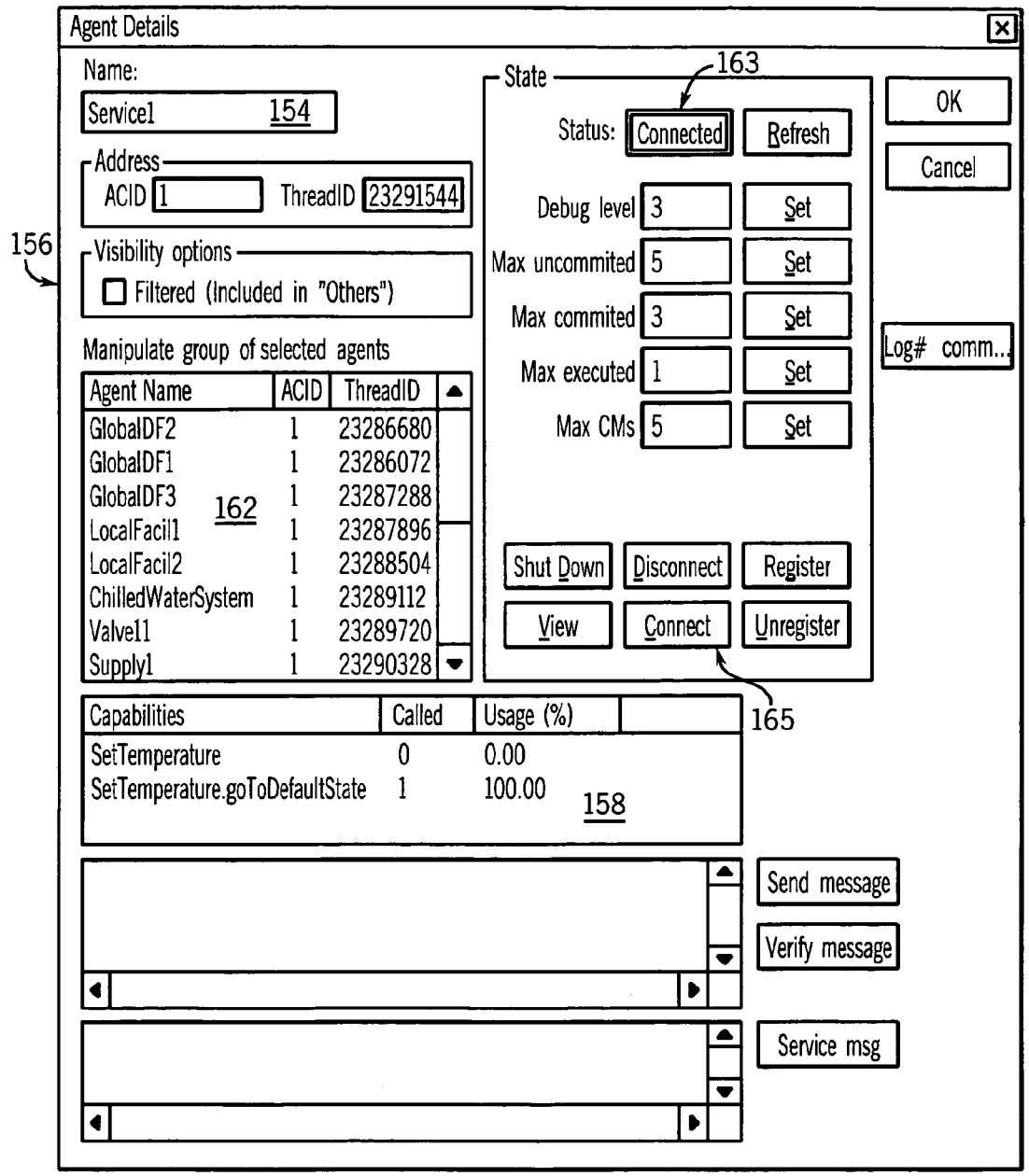
Figure 9:
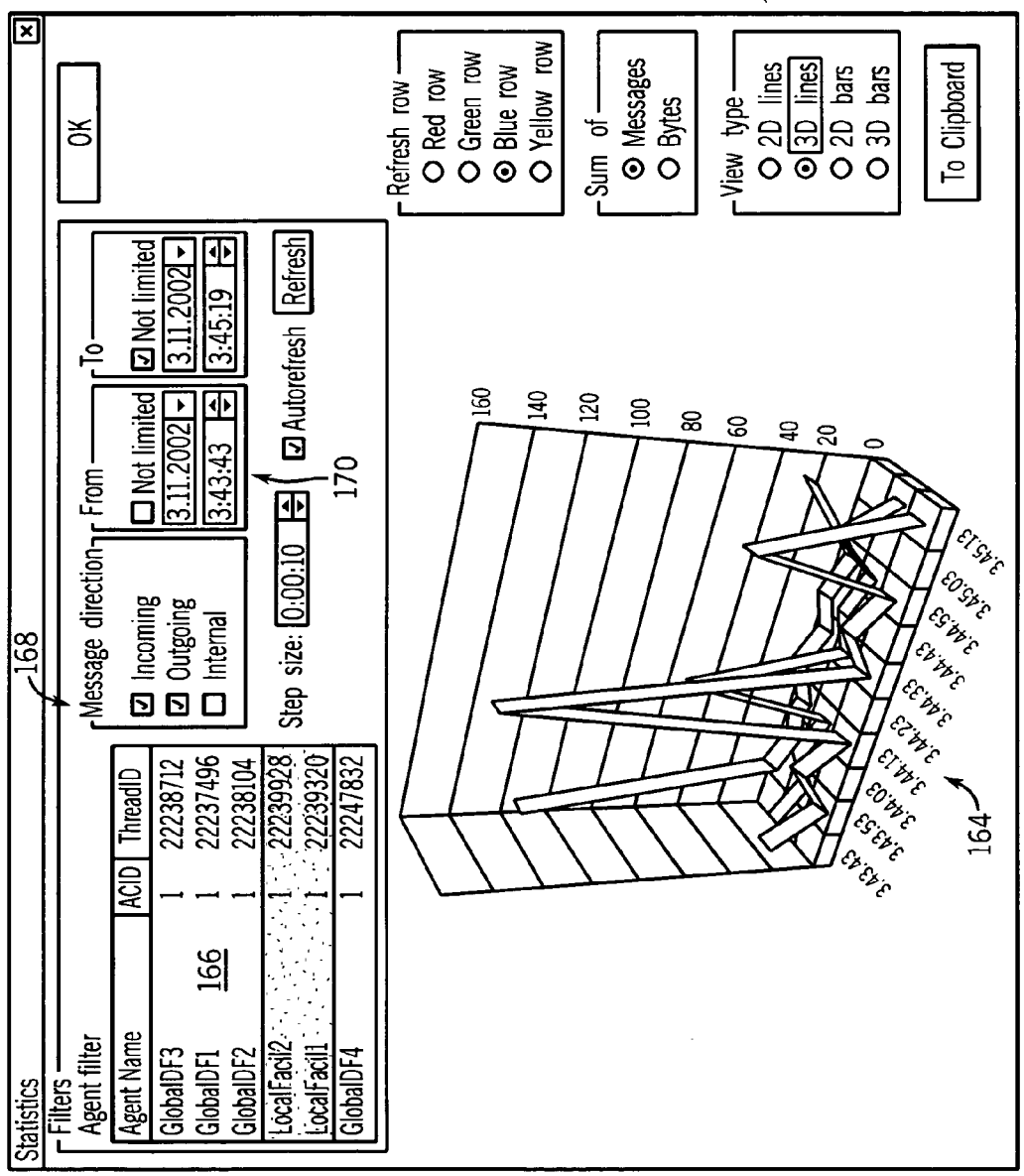

Turning to FIGS. 7–9, also in accordance with one embodiment of the present invention, the HMI 20 is further capable of displaying additional screens (or windows) in addition to the screen 80. In particular as shown in FIG. 7, the second screen 120 provides a message filter window that allows a user to specify certain characteristics of messages by which the HMI 20 can sort messages and in turn display or avoid the displaying of certain messages. The second screen 120 appears when a user provides an appropriate command, for example, when a user selects one of the messages displayed on the screen 80 (e.g., by "right clicking" on that message) and then further selects a "Message Filter" menu item (e.g., by "left clicking" on that item) from a menu appearing in response to the first user selection.

In the embodiments shown, the selectable characteristics of the message filter window generally can be grouped into two categories, a first category 146 pertaining to request-type messages (e.g., work bid request messages) and a second category 148 pertaining to inform-type messages (e.g., bid messages). By checking any of a number of boxes 150 in these different categories, different types of messages can be selected so that those messages are displayed or not displayed on the screen 80. Thus, a user can select whether or not messages concerning planning, commitment, non-commitment, execution of work units/sub-work units, and failures to execute work units/sub-work units are displayed. Also, as shown in FIG. 7, a user can specify a variety of other screen display characteristics relating to the display of messages on the screen 80, such as color coding of message types and indicating whether messages have been successful or failed. This in turn allows the screens 81, 84, 86 and 88 to be more effective in communicating information regarding the various messages.

The third screen 160 of FIG. 8 shows an agent information window that both allows for the display of various agent-related information and also, like the message filter of FIG. 7, allows a user to select certain agents so that they are displayed or not displayed on the windows 81, 84, 86 and 88 of the first screen 80 (e.g., to apply an agent filter). The third screen 160 can appear in response to an appropriate user command, for example, when a user "right clicks" on a particular agent shown on the first screen 80 and then selects a "Show agent . . . " menu item. When the third screen 160 appears, the selected agent appears within a top box 154 (in this example, the selected agent is the Service1 agent). Other boxes and portions of the screen 160 provide additional information regarding the selected agent. For example, in a box 158, capabilities of the selected agent are displayed. Further, a box 162 provides a list of all of the agents. If a user selects one or more agents in the box 162 then other portions of the third screen 160 (in particular, those labeled 154, 158, 156 and 163, the latter two of which are described further below) are updated to show information about the first agent selected in the box 162. Additional boxes 163 provide information concerning a state/status of one or more of the agents.

Additionally, an option box 156 is provided on the third screen 160 that allows a user to indicate whether the selected agent should be filtered out from being displayed on the screen 80. To the extent that an agent has been filtered out from the screen 80, the agent is then not expressly shown on that screen but rather is included as part of a group of agents shown on the screen as "others". Thus, if a user has specified that a particular agent should be filtered out, the user can still select that agent and change the filter setting by selecting "others" from the first screen 80.

Further, the third screen 160 allows a user to control agents of the distributed control system 10 in certain manners. In particular, a user is able to specify whether an agent is shut down, connected/disconnected or registered/unregistered from the distributed control system by way of selectable buttons 165.

Finally, the fourth screen 200 can show various statistical information regarding the operation of various agents and their communication with one another by various messages. As shown, in the preferred embodiment, information is displayed in a three-dimensional graphical table 164 (in alternate embodiments, the information can be displayed in another form, such as a two-dimensional table). In the present embodiment, the fourth screen 200 is particularly useful as a resource by which a user can obtain more detailed information about the communication load between agents, for example, communication load as a sum of messages or, in other circumstances, as a sum of bytes sent per unit time. Typically, the information provided on the fourth screen 200 pertains to a particular set of agents, messages, and/or periods of time that are of interest to (and specified by) a user. In the example shown, the fourth screen 200 illustrates communication among two agents LocalFacil1 and LocalFacil2 that have been selected by a user from an agent list box 166 and other agents in the system. The displayed statistical information concerns both incoming and outgoing messages as selected by way of selection box 168, and messages that are communicated within a particular time period specified by the user in boxes 170.

The windows 80, 120, 160 and 200 provided by the HMI 20 can be used to display information in either of two modes of operation of the multi-agent distributed control system 10. First, the windows can display information about the distributed control system 10 as it is occurring, in an online or real-time mode. That is, the HMI 20 is able to receive and send messages to and from agents, and able to monitor the status, intercommunications, and other activities of those agents as those agents are operating. Further, the system in certain circumstances allows for the user to set or reset the states of certain agents by varying certain characteristics of the agents (e.g., by way of the buttons 165 of the third screen 160 discussed above).

Second, the system is capable of operating at an offline mode, where it displays information that has been captured and saved in a memory device in the HMI 20 or any one of controllers 4,14 (or external devices). Thus, after the multi-agent distributed control system 10 has operated for a period of time, the operation of the agents can be analyzed, modified, and debugged. Thus, the HMI 20 by way of the information and user-selectable options displayed in the screens of FIGS. 6–9 allows for monitoring, controlling, deploying, and debugging of the multi-agent distributed control system, both while the system is running and after the system has ceased operating.

It is specifically intended that the present invention not be limited to the embodiments and illustrations contained herein, but include modified forms of those embodiments including portions of the embodiments and combinations of elements of different embodiments as come within the scope of the following claims. For example, it will be understood to one of ordinary skill in the art that the function responsibilities of different software and hardware components discussed above can in some cases be moved from one component to another, that software shown to be firmware in some embodiments need not be firmware, and that the invention should not be considered to be limited to the particular functional divisions discussed above except insofar as it is essential to the purposes described herein. Manners of displaying information and providing selectable options to users can vary from those disclosed above. Further, the present invention is applicable to a variety of multi-agent distributed control systems employing any of a variety of control devices such as (but not limited to) industrial controllers, automation controllers, personal computers, and other computerized devices, and any of a variety of different types of human machine interfaces.

We claim:

1. A system for allowing a user to interact with a multi-agent distributed control system, the system comprising:
a computerized terminal on which is displayed a user interface, wherein the user interface includes
a first window displaying a workflow among a first plurality of agents of the multi-agent system wherein the workflow shows agents visually linked with respect to planning, commitment or execution of work undertaken by the agents in effecting the distributed control;
wherein the user interface further includes at least one of:
a second window displaying a first list of messages sent between pairs of agents of one of the first plurality of agents and a second plurality of agents of the multi-agent system; and
a third window displaying a second list of work units requested by at least one of the agents of the first and second pluralities of agents;

wherein the user interface includes the second window, wherein across a top portion of the second window are listed the agents between which the messages of the first list were sent, wherein extending downward from each of the listed agents are respective vertical lines corresponding to the respective listed agents, and wherein a plurality of arrows representative of the messages between the listed agents connect the respective vertical lines corresponding to the listed agents between which the messages were sent.

2. The system of claim 1, wherein the workflow is displayed as a tree-type diagram linking a primary agent of the first plurality of agents and at least one secondary agent of the first plurality of agents, wherein the primary agent created a work request and the at least one secondary agent performed at least one of planning, commitment or execution of work in response to the work request.

3. The system of claim 2, wherein the at least one secondary agent includes a second plurality of agents.

4. The system of claim 3, wherein the tree-type diagram includes the primary agent, a first layer of the secondary agents that are directly in communication with the primary agent and a second layer of the secondary agents that are directly in communication with the secondary agents of the first layer.

5. The system of claim 4, wherein the tree-type diagram includes a first plurality of arrows connecting the primary agent to each of the secondary agents of the first layer, and a second plurality of arrows connecting the secondary agents of the first layer with the secondary agents of the second layer, and wherein each of the arrows represents at least one message between a respective pair of the agents.

6. The system of claim 5, wherein one of the arrows represents a plurality of messages, the messages of the plurality are also listed in the first window.

7. The system of claim 1, wherein the user interface includes both of the first and second windows displaying the first and second lists.

8. The system of claim 1, wherein the first list also includes numbers, times and descriptions corresponding to the listed messages.

9. The system of claim 1, wherein the user interface includes the third window, wherein the third window displays descriptive information along with the listed work units, and wherein the descriptive information includes at least one of work unit identifiers corresponding to the listed work units, names corresponding to the listed work units, numbers of messages belonging to the listed work units, original requesters corresponding to the listed work units, and status indications corresponding to the listed work units.

10. The system of claim 1, wherein the user interface additionally includes a fourth window that displays content of at least one selected message.

11. The system of claim 10, wherein the content includes content in at least one of a JDL format, a XML format, a KQML format, a HTML format, and a FIPA ACL format.

12. The system of claim 1, further comprising a filter, wherein the filter is capable of at least one of:
causing at least one of the first window and a second window to display only a subset of the first plurality of agents; and
causing at least one of the first and second windows to display only a subset of messages occurring among the first plurality of agents.

13. The system of claim 1, wherein the user interface is capable of displaying in addition to the first window, a second window that provides information regarding at least one agent characteristic, and wherein the information displayed in the second window is capable of being altered in response to user commands provided by a user input device selected from the group consisting of a mouse, a keyboard, a touch screen, a voice-response unit, a touch pad and an alternate input device.

14. The system of claim 13, wherein the information regarding the agent characteristic includes at least one of an agent name, an agent address, an agent filtration, an agent status, an amount of debugging information, an agent capability, and a proportional usage, and wherein an alteration in the information can be provided to a related agent of the multi-agent system.

15. A system for allowing a user to interact with a multi-agent distributed control system, the system comprising:
a computerized terminal on which is displayed a user interface, wherein the user interface includes
a first window displaying a workflow among a first plurality of agents of the multi-agent system wherein the workflow shows agents visually linked with respect to planning, commitment or execution of work undertaken by the agents in effecting the distributed control
wherein the user interface includes the second window displaying additional information, and wherein the displaying of information in the first and second windows is coordinated so that, when a user input is received in relation to certain information displayed in one of the windows, at least some of the information displayed in the other of the windows is varied;
wherein the user interface displays each of a second window capable of displaying a first list of messages, a third window capable of displaying work units, and a fourth window capable of displaying message content, and
wherein when the user input is a selection of one of the messages listed on the second window, the third window then displays at least one work unit corresponding to the selected message, the fourth window displays corresponding content of the selected message, and the first window displays at least a portion of a workflow of the at least one work unit.

16. A system for allowing a user to interact with a multi-agent distributed control system, the system comprising:
a computerized terminal on which is displayed a user interface, wherein the user interface includes
a first window displaying a workflow among a first plurality of agents of the multi-agent system wherein the workflow shows agents visually linked with respect to planning, commitment or execution of work undertaken by the agents in effecting the distributed control;
wherein the user interface is capable of displaying, in at least one of the first window and a second window, statistical information regarding amounts of communication occurring among the first plurality of agents;
wherein the amounts of communication are calculated based upon one of sums of numbers of messages and sums of bytes communicated per unit time, and wherein the statistical information can be limited to a subset of statistical information corresponding to at least one of an agent subset, a message subset and a time period.

17. A system for allowing a user to interact with a multi-agent distributed control system, the system comprising:
- a computerized terminal on which is displayed a user interface, wherein the user interface includes
- a first window displaying a workflow among a first plurality of agents of the multi-agent system wherein the workflow shows agents visually linked with respect to planning, commitment or execution of work undertaken by the agents in effecting the distributed control;
- wherein the user interface displays information in at least one of a on-line mode of operation and an off-line mode of operation, wherein in the on-line mode of operation the information that is displayed by the user interface concerns operations of the multi-agent system that are presently occurring, and wherein in the off-line mode of operation the information that is displayed by the user interface concerns operations of the multi-agent system that have already occurred.

18. The system of claim 17, further comprising a memory device on which is stored agent operational information that can be used later by the system when operating in the off-line mode.

19. A method of interacting with a multi-agent distributed control system employing a plurality of controllers on which are programmed a plurality of agents, the controllers being coupled by a network, the method comprising:

providing a computer program capable of operating a user interface, wherein the computer program is in communication with the agents via the network; and displaying agent-related information on the user interface by way of a plurality of windows, wherein within a first of the windows is further displayed a workflow among at least some of the agents wherein the workflow shows agents visually linked with respect to planning, commitment or execution of work undertaken by the agents in effecting the distributed control, and within a second of the windows is further displayed at least one of a plurality of messages communicated among at least some of the agents, a work unit requested by at least one of the agents, and message content associated with at least one of the messages;

wherein the agent-related information displayed on the user interface is at least one of information concerning current operation of the agents and information concerning past operation of the agent, wherein when the agent-related information concerns past operation of the agents, the agent-related information is obtained from a storage device that has recorded the information during the past operation go the agents.

* * * * *